United States Patent Office 3,484,912
Patented Dec. 23, 1969

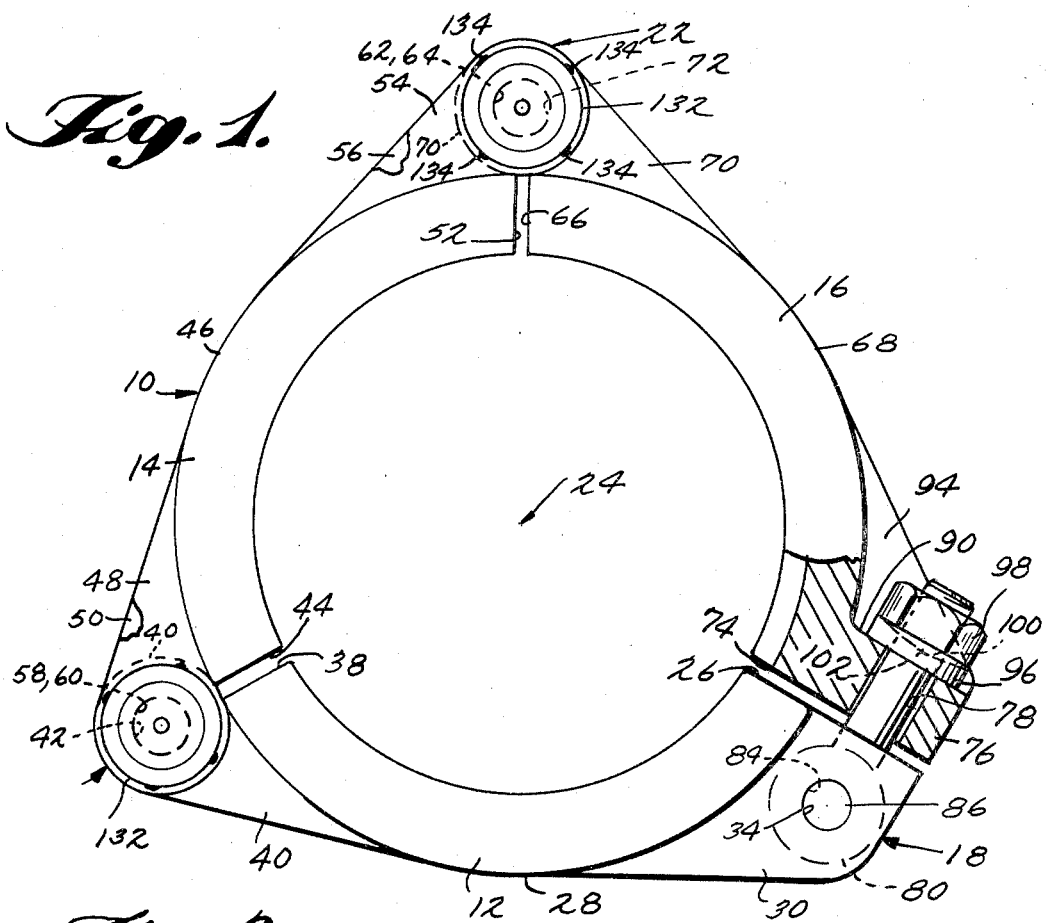
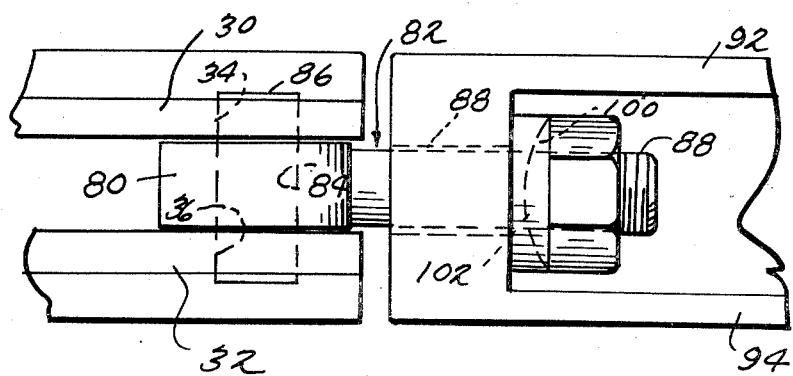

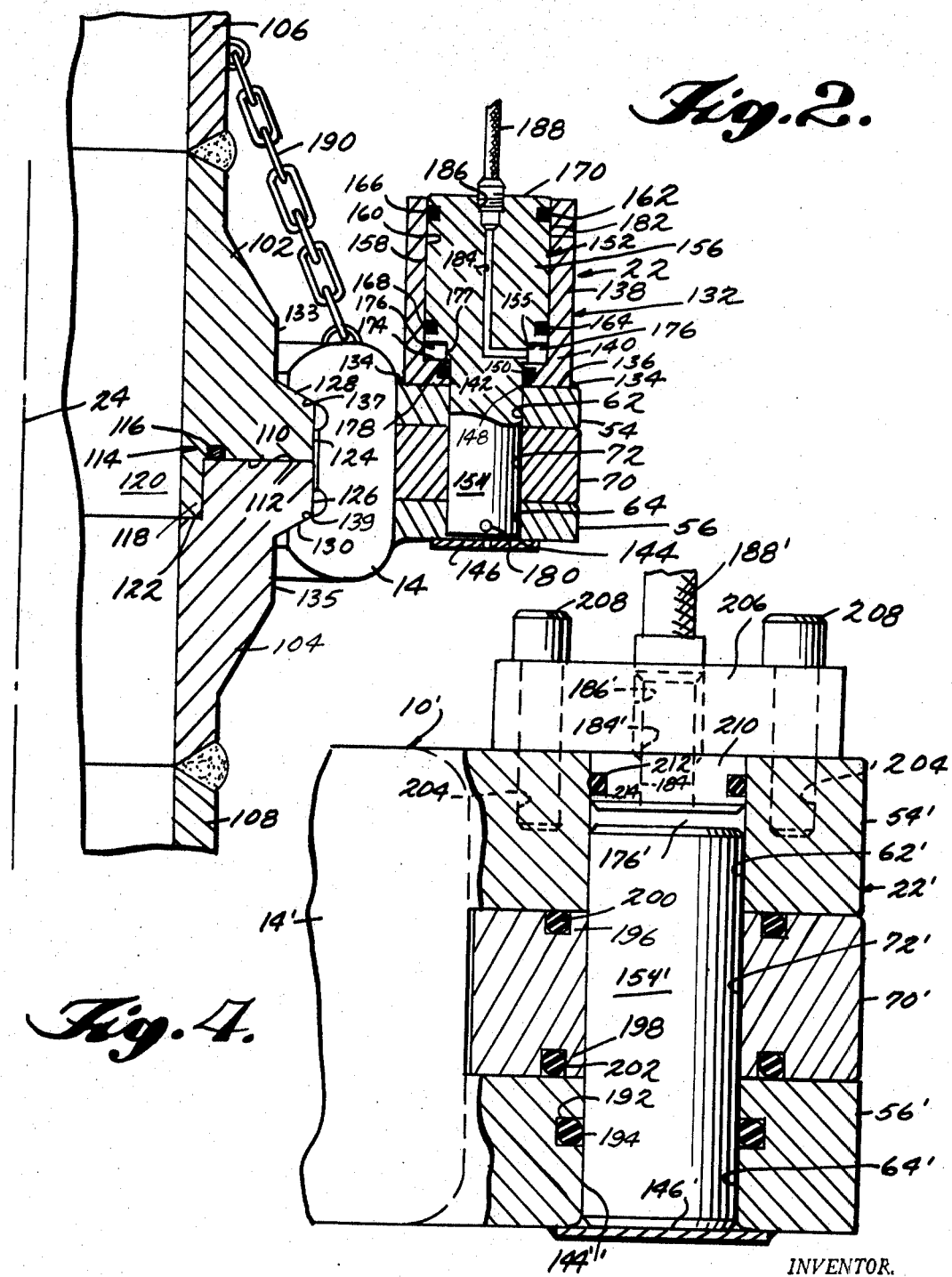

3,484,912
REMOTELY RELEASABLE PIPE CONNECTION
Robert L. Crain, Houston, Tex., assignor to Gray Tool Company, Houston, Tex., a corporation of Texas
Filed July 18, 1967, Ser. No. 654,131
Int. Cl. F16l 37/12, 19/09
U.S. Cl. 24—279                            13 Claims

ABSTRACT OF THE DISCLOSURE

A remotely disconnectable connection for peripheral engagement with adjacent flanged ends of fluid confining elements, such as pipe, including a plurality of arcuate segmental clamping elements pivotally connected to define a generally radially expansible-contractile annular clamping assembly. The segmental clamping elements are interconnected at pivots axially aligned with the longitudinal axis of the clamp. At least one of the pivot arrangements includes interdigitated, axially aligned hinge knuckles which receive, in piston and cylinder fashion, a hinge pin. A fluid pressure line connection to the pin permits its withdrawal from a remote control location to disassemble the clamp from the connection.

BACKGROUND OF THE INVENTION

Need for disconnection of conduits rapidly and with certainty, from remote control locations, is exhibited in many technological fields including fuel and other liquid transfer operations between tankers or barges and terminal facilities, between tankers and flying vehicles or floating vessels; fueling of space vehicles; transfer of radioactive, corrosive or otherwise dangerous fluids; as well as the drilling and completion of underwater wells, such as petroleum wells, from offshore locations.

To fill the need, many clamping arrangements have been conceived and some executed and successfully used. These are exemplified by the connector shown on page 2106 of the 1966–67 edition of the Composite Catalogue of Oil Field Equipment and Services, published by the Gulf Publishing Company of Houston, Tex.; the clamping arrangements shown in the U.S. patents of Watts et al., 3,231,297 and Watts, 3,181,901. It should be apparent that the expense of providing the structure shown on page 2106 of the Composite Catalogue, while necessary in many operations, may not be justifiable in other instances and that, for many applications a less elaborate structure would suffice.

Furthermore, it should be apparent that the Composite Catalogue and Watts et al. structures operate through enlargement and contraction of the clamp segment annulus, but are not disassemblable or capable of being positively unwrapped from the pipe connection to break the connection. The last-mentioned feature where lacking does not detract from the usefulness of equipment used for the purposes for which it was designed, but would, if provided, be an advantage in many situations, for instance where clamp or coupling parts had corroded or acquired encrustations of marine life since installation; where the coupling is in tight quarters or has an unusual, for instance, inverted, oblique or horizontal orientation.

Other prior art devices which require the rotation of a toggle or the shearing or pulling of a pin device mounted tangentially or arcuately of the clamp annulus have been proposed, but cannot be used in many instances since the stresses operating on the clamp during its use to connect parts has its principal vector aligned with the axis along which the pin device is to be pulled or sheared thus setting up too great a potential for unexpected clamp failure through stress-caused premature disassembling of the clamp.

SUMMARY OF THE INVENTION

Objects of the present invention include provision of a clamping arrangement which can be rapidly applied and remotely disconnected, but which can be inexpensively constructed, compared to prior art hydraulically disconnectable clamps, so as to permit its use in a broad range of situations; yet be safely resistant to premature disassembly and insensitive, so far as successful disassembly is concerned, to orientation of the coupling of which it forms a part.

The present invention accomplishes these objects by providing a remotely disconnectable connection for peripheral enagagement with adjacent flanged ends of fluid confining elements, such as pipe, including a plurality of arcuate segmental clamping elements pivotally connected to define a generally radially expansible-contractile annular clamping assembly. The segmental clamping elements are interconnected at pivots axially aligned with the longitudinal axis of the clamping. At least one of the pivot arrangements includes interdigitated, axially aligned hinge knuckles which receive, in piston and cylinder fashion, a hinge pin. A fluid pressure line connection to the pin permits its withdrawal from a remote control location.

IN THE DRAWINGS

FIGURE 1 is a top plan view of an assembled clamp constructed according to the principles of the present invention, with a portion broken away to expose details otherwise hidden;

FIGURE 2 is a longitudinal sectional view of the clamp taken along the lines 2—2 of FIGURE 1, showing the clamp coupling two conduits to one another, and one of the novel quick release pin hinges of the clamp;

FIGURE 3 is a fragmentary side elevation view of the swing-bolt hinge of the clamp; and FIG. 4 is a longitudinal sectional view, similar to FIGURE 2 of a modification.

DESCRIPTION OF THE PREFERRED EMBODIMENTS

Referring to FIGURES 1–3, a clamping arrangement constructed in accordance with the principles of the invention is illustrated at 10. The clamp 10 comprises three arcuate segmental clamping elements 12, 14, 16 connected to one another in endwise relationship at pivot joints 18, 20, 22. For purposes of orientation, the longitudinal axis of the clamp 10 appears at 24 in FIGURES 1 and 2.

The segmental clamping element 12 extends through an angle of slightly less than 120 degrees. Adjacent and leading to its end 26, the backside 28 of the element 12 is provided with two axially spaced, axially aligned, radially directed flanges 30, 32 which taper radially to the vanishing point near the angular midpoint of the element 12. Adjacent the element 12 end 26, the flanges 30, 32 are provided with axially aligned openings 34, 36.

Adjacent and leading somewhat past its opposite end 38, the segmental clamping element 12 backside 28 is provided with an axially centrally located, radially directed, generally teardrop-shaped flange 40 which tapers radially to the vanishing point near the angular midpoint of the element 12. Centered just beyond the element 12 end 26, the flange 40 is axially centrally provided with an axially directed opening 42.

The segmental clamp element 14 extends through an angle of slightly less than 120 degrees and is symmetrical about the imaginary radial transverse cross section cutting plane which contains its angular midpoint. Adjacent and leading somewhat past its end 44, the segmental clamping element 14 backside 46 is provided with two axially spaced, radially directed, generally teardrop-shaped flanges 48, 50 which taper radially to the vanishing point near the angular midpoint of the element 14. Likewise, adjacent and leading somewhat past its opposite end 52, the segmental clamping element 14 backside 46 is provided with two axially spaced, radially directed, generally teardrop-shaped flanges 54, 56 which taper radially to the vanishing point near the angular midpoint of the element 14.

Centered just beyond the element 14 ends 44, 52, the flanges 48, 50 and 54, 56 are respectively provided with openings 58, 60 and 62, 64 having longitudinal axes aligned within the flange pair and all parallel to that of the clamp.

The clamping element 16 extends through an angle of slightly less than 120 degrees. Adjacent and leading somewhat past its end 66 the segmental clamping element 16 backside 68 is provided with an axially centrally located, radially directed, generally teardrop-shaped flange 70 which tapers radially to the vanishing point near the angular midpoint of the element 16. Centered just beyond the element 16 end 66, the flange 70 is provided with an axially directed opening 72.

At its opposite end 74, the element 16 is provided with a radially outwardly directed tang 76, having an opening 78 provided therethrough axially centrally of clamp, intermediate the radial extent of the tang, along a hole axis parallel to a tangent of the segmental element 16 at the base of the tang 76. When the clamp is assembled as shown in FIGURE 1, the axis of the centers of the openings 34 and 36 crosses the axis of the opening 78 at a right angle.

Assembly of the clamp 10 involves insertion of the element 12 flange 40 between the element 14 flanges 48, 50, aligning the opening 42 with the openings 58, 60 and inserting a pivot pin to establish the joint 20. Assembly further includes insertion of the element 16 flange 70 between the element 14 flanges 54, 56, aligning the opening 72 with the openings 62, 64 and inserting a pivot pin to establish the joint 22. It should be apparent that an equivalent clamp would be produced by providing one flange at each end of the element 14 and two axially aligned flanges at each adjacent end of the elements 12 and 16. Assembly of the clamp 10 is completed by inserting the eye 80 of a swing bolt 82 between the flanges 30, 32, aligning the opening 84 of the eye 80 with the openings 34, 36 and inserting a pivot pin 86 at the joint 18. In the embodiment shown, the opening 84 is of larger diameter than the openings 34, 36, and the pin 86 is of a diameter to be force or press fit into the openings 34, 36 thereby securing the pin 86 in place while leaving the swing bolt 82 free to pivot about the pin 86. The opening 78 through the tang 76 is sufficiently large as to loosely receive the bolt 82 and allow a small amount of angular disparity between the longitudinal axes of the bolt 82, threaded shank 88 and the opening 78.

In the embodiment shown, the backside 90 of the tang 76 peripherally of the opening 78 is normal to the longitudinal axis of the opening 78. Triangular webs 92, 94 at the axial extremes of the tang reinforcingly connect the tang, along its radial extent, to the backside of the segmental clamp element 16 adjacent the base of the tang 76.

The bolt 82, shank 88 protrudes through the tang and receives an annular washer 96 and nut 98. The washer 96 has a flat face abutting the tang backside 90 and annular spherically dished face 100 presented toward the nut 98. The nut 98 has a spherically bellied face 102 presented toward and cooperatively engaging the washer face 100 for better distributing clamping force as the nut 98 is tightened.

In operation the clamp 10 segments 12, 14 and 16 are connected at 20 and 22, but the bolt 82 left free of the tang 76. The clamp may then be freely swung open about the pivots 20, 22, wrapped about the two members to be coupled, swung closed about the pivots 20, 22, the bolt 82 inserted in the opening 78, the washer 96 slipped on and the nut 98 tightened to the desired degree of tightness, thus radially contracting the clamp about the parts being joined.

The shapes of the surfaces on the clamp and parts being joined which allow cooperation to establish and break the coupling are not essential to the operation of the new clamp, but a preferred construction will be seen in FIGURE 2. Generally, the radial inner surfaces of the clamp 10 and corresponding surfaces on the outside of the parts to be joined are those of the clamp and parts in the U.S. patent of Watts et al. 2,766,829 (see FIGURE 8, elements 18, 22, 36, 38, except that in the present instance the ring S, which could have been included, has been omitted so that the ends of the coupled parts directly abut one another). More specifically, the clamp 10 is shown joining the end hubs 102, 104 of axially aligned conduits 106, 108, such as petroleum well casing pipe. The hubs 102, 104 have axially facing, radially extending, annular end faces 110, 112 which abut one another. A conventional seal 114 (shown comprising a resilient annulus 116 received in a concentric groove in the end face 110 and an axial lip 118 extending from adjacent the bore 120 of the hub 102 and slidingly received in a corresponding circumferential recess 122 in the bore of the hub 104 adjacent and leading to the end face 112) is provided between the hubs 102, 104. Externally, leading from the respective end faces 110, 112, the hubs 102, 104 are provided with radially outwardly facing, annular outer surfaces 124, 126 leading to frustoconically curved clamp receiving wedging surfaces 128, 130 which decrease in diameter axially away from the respective outer surfaces 124, 126, and portions 133, 135 of sufficiently relieved diameter to avoid interference with tightening of the clamp 10. The three clamp segmental elements 12, 14, 16 are internally provided with generally radially inwardly concave surfaces including, adjacent both axial extremes of the generally concave surfaces, frustoconically curved wedging surfaces 137, 139 which decrease in diameter toward the axial extremes of the clamp 10. The surfaces 137, 139 are respectively configured to extensively wedgingly engage the conduit hub surfaces 128, 130 to draw the hubs axially toward one another, to abutment as shown, as the clamp is contracted through tightening of the nut 98 (FIGURES 1 and 3). The details of the clamp joint 18, as shown, are exemplary of means which can be easily assembled and tightered in the field. This swing bolt joint could be replaced by, for instance: the joint shown in FIGURE 2 of the aforementioned U.S. patent of Watts 3,181,901; one of the joints shown at 42, 48, 50 in FIGURE 5 of the U.S. patent of Watts et al. 2,766,999; or one of the joints shown in FIGURES 108, 109 and 110 on page 2105 of the Composite Catalogue above referred to.

The new pivot joints 20, 22

The novel pivot pin assemblies 20 and 22 are identical to one another and will now be discussed in greater detail, with example being made of the pivot assembly 22 shown in FIGURE 2. A cylinder 132 is tack welded at four points 134 to the top surface 136 of the flange 54. The cylinder 132 includes a tubular side wall 138 integrally joining, at its lower extent, the radially outer extent of an annular, radially directed lower end wall 140. The latter is centrally provided with an opening 142 axially aligned with the openings 62, 72 and 64 and constituting therewith a constant diameter bore 144. The lower end of the bore 144 is bridged by a plate 146 welded to the lower surface of the flange 56. The cylinder lower end wall 140 within the opening 142 is provided with a circumferentially extending, radially inwardly opening groove 148 which receives an O-ring seal 150.

The cylinder 132 slidingly receives a piston 152 having a pivot pin 154 integrally coaxially extending from the nose 155 thereof. The piston 152 includes an enlarged portion 156 whose peripheral side wall 158 lies closely adjacent the interior surface 160 of the cylinder side wall 138 and is sealed with respect thereto by two axially spaced, radially outwardly opening grooves 162, 164 in the surface 158 which respectively receive O-rings 166, 168.

As shown in FIGURE 2, when the rear surface 170 of the piston 152 lies radially adjacent the upper end 172 of the cylinder side wall 138, the lower end of the pivot pin 154 lies adjacent the lower end of the bore 144, but the nose 155 is spaced axially above the interior surface 174 of the cylinder lower end wall, thus providing an annular chamber 176. The combination piston and pivot pin, within the chamber 176 is of slightly greater diameter than the opening 142 at 177, to provide an annular, downwardly facing shoulder 178, seatable on the surface 174 to limit incursion of the combination piston and pivot pin into the cylinder 132 and bore 144. When positioned as shown in FIGURE 2, the parts may optionally be pinned together from the exterior by a small laterally received shear pin 180 which limits the chance of premature withdrawal of the pivot pin 154. Likewise, the plate 146 reduces the chance that, in maneuvering the coupling from a remote point, for instance lowering the coupled pipes down to an underwater petroleum well, the pin 154 might be bumped from below by other equipment, causing its premature withdrawal.

The cylinder side wall 138 is provided with a radial vent opening 182 at such position, that when, during withdrawal of the pin 154, the lower O-ring 168 passes the opening 182, the lower end of the pin 154 will be nearly clear of the flange 70, opening 72.

The chamber 176 is accessible for pin withdrawing pressurization via a passageway 184 formed axially centrally in the piston from its upper end, down to radial adjacency with the portion 177, whereupon the passageway 184 proceeds radially outwardly to intersection with the exterior of the portion 177 and communication with the chamber 176. The passageway, adjacent and leading to the piston upper end is tapped at 186 to receive a flexible, tubular pressure hose 188. For pressurization of the chamber 176 to extend the piston and withdraw the pivot pin, the pressure hose 188 may be connected to any fluid pressure, such as an hydraulic pump or to a gas generating explosive squib.

When it is desired to release the clamp 10, pressure is applied through the hose 188. The pressure will be transmitted through the passageway 184 to the chamber 176 and will act against the nose 155 and cylinder end wall surface 174. The piston and pivot pin will move upward thus disengaging the joint 22 as the pivot pin clears the opening 72. The O-ring seals at 150, 168 retain pressure as the pin is pulled, until the seal 168 passes the port 182. The seal ring 166 merely protects the cylinder wall prior to actuation of the piston.

Since the pressure line 188 is connected axially centrally to the top of the piston, if for some reason the pressure does not completely drive the piston and pin from the cylinder and bore, the pressure line can be tugged to complete the disassociation.

Disassociation of the joint 20 is preferably actuated concurrently with that of the joint 22, thus positively separating the clamp into two pieces, one containing the element 14 and the other containing the elements 10 and 16, pivotally joined at 18. In order to allow easy recovery of the clamp segmental elements, each may be loosely chained to the conduit 106 as illustrated at 190 in FIGURE 2.

The joints 20 and 22 are easily reusable once actuated and, may be removed from the clamp and replaced by conventional pivot pin if no longer needed, since the connection at 134 merely comprises tack welding which can be severed when desired. Tack welding is the only connection needed at this point because, during actuation, the pressure tends to force the cylinder axially toward the flange 54 upon which it is mounted.

A modification of the pivot joint 22 is shown at 22' in FIGURE 4. In this more compact assembly, the cylinder and hinge have been combined as have the pivot pin and piston.

As shown, the clamp 10' flanges 54', 70' and 56' are provided with openings 62', 72' and 64' aligned to provide a bore 144' closed at the bottom with a plate 146' welded to the lower surface of the flange 56'. A cylindrical pivot pin 154' is received in the bore 144' having its lower end near the plate 146' and its upper end intermediate the upper and lower ends of the opening 62'. The flange 56' is provided with a circumferential radially inwardly opening groove 192 which received an O-ring 194 for sealing between the piston and the cylinder near the lower end of the cylinder.

The upper and lower faces of the flange 70' are grooved at 196, 198 circumferentially of the openings 72' intersections therewith to respectively receive O-rings 200, 202 which seal between the flanges 56', 70' and 54' to prevent premature pressure leakage from the cylinder during withdrawal of the pivot pin 154'. The flange 54' peripherally of the opening 62' is provided with a plurality of upwardly opening, angularly spaced, threaded sockets 204. A cylinder head 206 is mounted on flange 54' via socket head cap screws 208 threaded into the sockets 204.

The cylinder head includes an integral central cylindrical boss 210 which slidingly fits into the upper end of the bore 144' but terminates short of the upper end of the piston-pivot pin 154' to define a chamber 176'. The cylinder head is sealed to the cylinder via an O-ring 212 received in an outwardly opening annular groove 214 in the side of the boss 210. The chamber 176' is pressurized via a passageway 184' formed axially centrally through the cylinder head and tapped at 186' for connection to a pressure hose 188'.

When fluid pressure is transmitted through the hose 188' the force transmitted to the upper end of the piston-pivot pin 154', drives the latter downwardly, detaching the plate 146' from the flange 56' and projecting the pin 154' out the bottom of the bore 144', thus positively disassembling the joint 22'.

It should now be apparent that the remotely releasable connection described hereinabove possesses each of the attributes set forth in the specification under the heading "Summary of the Invention" hereinbefore.

I claim:

1. In an expansible-contractile annular clamp having a plurality of segmental clamping elements secured to one another in endwise relationship for contraction to circumferentially engage a plurality of parts to couple the parts, the improvement wherein at least one segmental clamping element is pivotally secured to an adjacent segmental clamping element by a remotely releasable pivot joint comprising: first flange means on said one segmental clamping element projecting radially outwardly therefrom near one end thereof, second flange means on said adjacent segmental clamping element projecting radially outwardly therefrom near one end thereof; said first and second flange means being adjacent one another axially of the clamp; means defining an opening axially through the first flange means; means defining an opening axially through the second flange means, the first flange opening and second flange opening being axially aligned; a pivot pin received in said openings, means on said one segmental element and pin cooperating to retain said second flange axially adjacent said first flange prior to release of said joint; and remotely actuable fluid pressure means mounted on said first flange in communication with said pivot pin for withdrawing said pivot pin from said openings.

2. The clamp of claim 1 wherein the means cooperating to retain the second flange axially adjacent the first flange comprises an additional flange on said first segmental element projecting radially outwardly therefrom in axially spaced axial alignment with said first flange, said second flange being sandwiched between said first and additional flanges; means defining a socket in said additional flange in axial alignment with the first and second flange openings and opening toward said second flange; said pivot pin extending into said socket.

3. The clamp of claim 2 wherein said socket means is defined by an opening axially through said additional flange and a plate secured to the bottom of the additional flange bridging the opening through the additional flange.

4. The clamp of claim 3 wherein the means for withdrawing the pivot pin from said openings comprises a cylinder head mounted on said first flange and covering the opening through said first flange, said pivot pin having an upper end spaced below said cylinder head thereby defining a chamber within said openings in said first and second flanges, between the pivot pin and cylinder head; sealing ring means circumferentially sealing said first flange to said cylinder head peripherally of the opening through the first flange; sealing ring means sealing said first flange to said second flange peripherally of said openings therethrough; sealing ring means sealing said second flange to said additional flange peripherally of said openings therethrough; means defining a conduit through said cylinder head for admission of fluid pressure to said chamber; said pivot pin being constructed and arranged to engage and detach said plate from covering said opening through said additional flange as admission of fluid pressure to said chamber causes application of force to the upper end of said pivot pin, thereby forcing said pivot pin out of the opening through said second flange and releasing the pivot joint.

5. The clamp of claim 4 additionally comprising means defining a radially inwardly opening circumferential groove in the additional flange within the opening therethrough; and a sealing ring received in the groove, said sealing ring sealingly circumferentially engaging both said additional flange and said pivot pin.

6. The clamp of claim 1 wherein the remotely actuable fluid pressure means mounted on the first flange for withdrawing the pivot pin from the openings comprises: a cylinder having a tubular side wall, an open upper end and an annular lower end wall; said annular lower end wall having an opening centrally therethrough in axial alignment with the opening through said first flange; means detachably securing said cylinder to said first flange; a piston slidingly received in said cylinder through said upper end; said pivot pin extending through said annular lower end wall opening and being connected to said piston; means defining an annular downwardly facing shoulder on said piston near the lower extent thereof, said shoulder being presented toward and spaced above the cylinder lower end wall thereby defining a chamber within the cylinder between the shoulder and the lower end wall; means defining a passageway through said piston having an outer end opening exteriorly of the cylinder, connectible to a fluid pressure source, and an inner end in communication with said chamber; said passageway being constructed and arranged to conduct fluid pressure to said chamber to force said piston and pivot pin upwardly for withdrawing the pivot pin.

7. The clamp of claim 6 further comprising a flexible hose connected to the piston at the outer end of said passageway for conducting fluid pressure to the chamber.

8. The clamp of claim 6 further comprising: an annular seal ring received in means defining a circumferential groove in the cylinder annular lower end wall within the opening therethrough, said seal ring circumferentially sealingly engaging the pivot pin and the cylinder annular lower end wall; an annular seal ring received in means defining a circumferential groove in the piston peripherally thereof adjacent said shoulder, said seal ring circumferentially sealingly engaging the piston and the cylinder tubular side wall; and means defining a lateral bleed port opening through said tubular side wall near the upper end thereof, so positioned that said seal ring on said piston reaches said bleed port a the lower end of the pivot pin nearly clears the second flange during withdrawal of said pivot pin.

9. The clamp of claim 8 wherein the means cooperating to retain the second flange axially adjacent the first flange comprises an additional flange on said first segmental element projecting radially outwardly therefrom in axially spaced axial alignment with said first flange, said second flange being sandwiched between said first and additional flanges; means defining an opening axially through said additional flange in axial alignment with the first and second flange openings; said pivot pin extending into the opening through said additional flange; and a shear pin proceeding laterally through said additional flange into said pivot pin to protect against premature withdrawal of the pivot pin.

10. The clamp of claim 9 further including a plate secured to the additional flange and bridging said opening therethrough to prevent accidental dislodging of the pivot pin during maneuvering of the clamp.

11. A remotely disconnectable connection for peripheral engagement with adjacent flanged ends of fluid confining elements, such as pipe, including: a plurality of arcuate segmental clamping elements pivotally connected to define a generally radially expansible-contractile annular clamping assembly; the segmental clamping elements being interconnected at pivot arrangements axially aligned with the longitudinal axis of the clamp; at least one of the pivot arrangements including a plurality of interdigitated, axially aligned hinge knuckles which receive, in piston and cylinder fashion, a hinge pin; a fluid pressure line connection to the pin and communicated to the interior of the cylinder for initiating withdrawal of the pin from a remote control location to disassemble the clamp from the connection.

12. A clamp comprising: three segmental clamping elements each extending through slightly less than 120 degrees and being connected to one another in endwise relationship at pivot joints aligned with the longitudinal axis of the clamp; the first of the segmental clamping elements being provided adjacent one end thereof, with an axially centrally located, radially outwardly directed, generally teardrop-shaped flange; means defining an axially directed opening through the flange just beyond said one end; the second of the segmental clamping elements being provided, adjacent one end thereof with two axially spaced, radially outwardly directed, generally teardrop-shaped flanges; means defining an axially directed opening through the last-mentioned two flanges, just beyond said one end, the last-mentioned two openings being axially aligned; the second of the segmental clamping elements also being provided, adjacent the other end thereof, with two axially spaced, radially outwardly directed, generally teardrop-shaped flanges; means defining an axially directed opening through the last-mentioned two flanges, just beyond said other end, the last-mentioned two openings being axially aligned; the third of the segmental clamping elements being provided, adjacent one end thereof, with an axially centrally located, radially outwardly directed, generally teardrop-shaped flange; means defining an axially directed opening through the last-mentioned flange just beyond said one end thereof; said flange adjacent said second element one end being received between said two flanges adjacent said first element one end, the respective openings therein being axially aligned, and a pivot pin being slidingly received therein; said flange adjacent said second element other end being received between said two flanges adjacent said third element on end, the respective openings therein being axially aligned, and a pivot pin being slidingly received therein; a first pin withdrawal assembly mounted on the upper of said first element two flanges in line with the opening therethrough; a second pin withdrawal assembly mounted on the upper of said third element two flanges in line with the opening therethrough;

each of the pin withdrawal assemblies comprising: a cylinder having a tubular side wall and a radially inwardly directed annular lower end wall having a central opening therethrough; a piston slidingly received in the cylinder and connected through said central opening to the respective pin; means defining an annular shoulder on the piston within the cylinder, said shoulder being spaced above and facing the cylinder annular lower end wall thus providing a chamber within the cylinder; means defining a passageway through the piston communicating the chamber with the exterior of the cylinder; and a flexible, tubular pressure hose secured to the piston, exteriorly of the cylinder in communication with the passageway for pressurization of the chamber to withdraw the respective pin; the clamp also comprising: cooperable means on the first element other end and on the third element other end for incrementally drawing the last-mentioned ends toward one another to generally radially contract the clamp; and means defining clamping surfaces on each of the three clamping elements, facing generally radially inwardly thereof and constructed and arranged to engage parts to be connected as said clamp is contracted.

13. A clamp as set forth in claim 12 wherein the cooperable means for incrementally drawing said last-mentioned ends toward one another comprises: two axially spaced, radially outwardly directed, generally teardrop-shaped flanges on said first clamping element adjacent said other end; means defining two axially directed openings through the last-mentioned two flanges, just beyond said other end, the last-mentioned two openings being axially aligned; a radially outwardly directed tang on said third clamping element at said other end; means defining an opening through said tang having a longitudinal axis parallel to a tangent of said third clamping element at the base of said tang; a swing bolt having an eye and a threaded shank; said eye being received between the last-mentioned two flanges; a pivot pin received through said openings through said last-mentioned two flanges and through said eye to pivotally mount said swing bolt on said first clamping element; said shank being loosely insertable in the opening through said tang so as to have a portion of said shank protrude therethrough; and a nut threadably received on said shank protruding portion, said nut being threadably advanceable on said shank to draw said first clamping element other end toward said third clamping element other end.

References Cited

UNITED STATES PATENTS

| | | | |
|---|---|---|---|
| 2,649,314 | 8/1953 | Richardson | 285—33 |
| 2,809,584 | 10/1957 | Smith | 285—407 XR |
| 3,109,216 | 11/1963 | Brown | 24—279 |
| 3,124,071 | 3/1964 | Mobley et al. | 285—33 |
| 3,181,901 | 5/1965 | Watts | 285—367 |
| 3,231,297 | 1/1966 | Watts et al. | 285—24 |

DONALD A. GRIFFIN, Primary Examiner

U.S. Cl. X.R.

102—49; 285—33, 367